United States Patent
Bae et al.

(10) Patent No.: US 9,868,085 B2
(45) Date of Patent: Jan. 16, 2018

(54) ABSORPTION TOWER HAVING ABSORPTION SEPARATOR

(71) Applicants: HYUNDAI MOTOR COMPANY, Seoul (KR); KOREA INSTITUTE OF ENERGY RESEARCH, Daejeon (KR)

(72) Inventors: Shin-Tae Bae, Hwaseong-si (KR); Sungchan Nam, Daejeon-si (KR); Sungyeoul Park, Daejeon (KR); Yeoil Yoon, Daejeon-si (KR)

(73) Assignees: Hyundai Motor Company, Seoul (KR); Korea Institute of Energy Research, Daejone (KR)

( * ) Notice: Subject to any disclaimer, the term of this patent is extended or adjusted under 35 U.S.C. 154(b) by 137 days.

(21) Appl. No.: 14/957,470

(22) Filed: Dec. 2, 2015

(65) Prior Publication Data

US 2016/0236139 A1    Aug. 18, 2016

(30) Foreign Application Priority Data

Feb. 16, 2015  (KR) .................... 10-2015-0023458

(51) Int. Cl.
| | |
|---|---|
| B01D 53/14 | (2006.01) |
| B01F 3/04 | (2006.01) |
| B01D 53/18 | (2006.01) |
| B01F 15/02 | (2006.01) |

(52) U.S. Cl.
CPC ............ *B01D 53/18* (2013.01); *B01D 53/14* (2013.01); *B01D 53/1475* (2013.01); *B01F 3/04078* (2013.01); *B01F 3/04468* (2013.01); *B01F 15/0203* (2013.01); *B01D 53/1425* (2013.01); *B01D 2258/0283* (2013.01); *Y02C 10/06* (2013.01)

(58) Field of Classification Search
CPC ............... B01D 19/0015; B01D 53/14; B01D 53/1425; B01F 3/04; B01F 3/04007; B01F 3/04078; B01F 3/04468; B01F 15/0203
USPC .................................... 261/76, 79.2
See application file for complete search history.

(56) References Cited

U.S. PATENT DOCUMENTS

| | | | |
|---|---|---|---|
| 9,410,750 B1* | 8/2016 | Kurukchi | ................ F28F 25/10 |
| 2007/0221065 A1* | 9/2007 | Aroonwilas | ........... B01D 53/14 96/243 |

FOREIGN PATENT DOCUMENTS

| | | |
|---|---|---|
| EP | 2703064 A1 | 3/2014 |
| JP | H10-249139 A | 9/1998 |
| JP | 2013-180281 A | 9/2013 |

(Continued)

*Primary Examiner* — Robert A Hopkins
(74) *Attorney, Agent, or Firm* — McDermott Will & Emery LLP

(57) ABSTRACT

A lean absorbent liquid supplier, disposed inside at an upper portion in the absorption tower housing, supplies a lean absorbent liquid into the housing. An absorption tower rectifier, disposed under the lean absorbent liquid supplier in the absorption tower housing, rectifies flow of the lean absorbent liquid supplied downwardly in the absorption tower housing, and dissolves an object gas in the lean absorbent liquid to generate a rich absorbent liquid. An absorbent liquid chamber, disposed below the absorption tower rectifier in the absorption tower housing temporarily stores the rich absorbent liquid therein. An absorption separator is disposed between the absorption tower rectifier and the absorbent liquid chamber in the absorption tower housing. The object gas is supplied to the absorbent liquid chamber.

10 Claims, 5 Drawing Sheets

(56) References Cited

FOREIGN PATENT DOCUMENTS

| JP | 2013-184080 A | 9/2013 |
|---|---|---|
| JP | 2014-018759 A | 2/2014 |
| KR | 10-2010-0113438 A | 10/2010 |
| KR | 10-2013-0023482 A | 3/2013 |
| KR | 10-2014-0074013 A | 6/2014 |

* cited by examiner

ABSORPTION TOWER HAVING ABSORPTION SEPARATOR

CROSS-REFERENCE TO RELATED APPLICATION

This application claims the benefit of priority to Korean Patent Application No. 10-2015-0023458 filed in the Korean Intellectual Property Office on Feb. 16, 2015, the entire content of which is incorporated herein by reference.

TECHNICAL FIELD

The present disclosure relates to an absorption tower with an absorption separator that is commonly applicable to gas-liquid separating processes. More particularly, the present disclosure relates to an absorption tower with an absorption separator that facilitates level control of rich absorbent liquid in an absorbent liquid chamber and prevents change of composition in absorbent liquid.

BACKGROUND

As global warming and air pollution become more severe, techniques for suppressing carbon dioxide emission into the atmosphere have been aggressively developed. Particularly, a method of efficiently trapping carbon dioxide emitted from thermoelectric power plants or boiler equipment has been under development.

Among various methods of trapping gas, a chemical absorption method using absorbent liquid has been most suitable to trapping carbon dioxide of large capacity. According to a gas collecting plant using the chemical absorption method, carbon dioxide emitted from thermoelectric power plants or boiler equipment is absorbed in absorbent liquid in an absorption tower and saturated absorbent liquid containing carbon dioxide is heated in a regeneration tower to separate regeneration gas containing the carbon dioxide from the absorbent liquid.

According to the conventional gas collecting plant, the carbon dioxide and the absorbent liquid contact with each other at a rectifier mounted in the absorption tower. The rectifier has an apparatus for collecting the absorbent liquid at a center portion mounted on a filler or a separating plate for separating gas evenly mounted on an upper portion of the absorption tower to prevent the absorbent liquid from mixing with the gas. That is, gas and liquid is prevented from communicating by changing a structure of the upper portion of the absorption tower. However, it is very difficult to control the conventional gas collecting plant when abnormal phenomena occur due to fast linear velocity of gas at a lower portion of the absorption tower and absorbent liquid drop.

In addition, a reboiler for heating the absorbent liquid is mounted at the regeneration tower as energy source for regeneration. The reboiler heats the absorbent liquid for regeneration to separate the gas contained in the absorbent liquid. The gas separated from the absorbent liquid moves toward the upper portion of the regeneration tower to be collected into a condenser, and the remaining gas is discharged from the regeneration tower.

Conventionally, a kettle reboiler or a thermocyphon reboiler is used.

The kettle reboiler includes first and second parts therein divided by a wall. A heater or a heat-exchanger is disposed in the first part, and an absorbent liquid outlet is formed at the second part. If the absorbent liquid containing gas is supplied to an upper portion of the reboiler, a level of the absorbent liquid in the reboiler rises. The absorbent liquid is heated by the heater or the heat-exchanger, and the gas is separated from the absorbent liquid and moves upwardly. As the absorbent liquid is supplied continuously, the absorbent liquid from which the gas is removed or which contains less gas crosses the wall and moves to the second part. After that, the absorbent liquid is discharged from the reboiler through the absorbent liquid outlet. According to the kettle reboiler, slosh occurs due to liquid wave generated by liquid drop and boiling of mixed liquid. Therefore, it is difficult to control a level of the absorbent liquid precisely.

The thermocyphon reboiler includes a heater or a heat-exchanger therein, and an absorbent liquid outlet is formed at a bottom surface of the reboiler. If the absorbent liquid containing the gas is supplied to an upper portion of the reboiler, the absorbent liquid in the reboiler is heated by the heater or the heat-exchanger and the gas is separated from the absorbent liquid and moves upwardly. At this time, the absorbent liquid from which the gas is removed or which contains less gas moves toward the bottom surface of the reboiler and is discharged from the reboiler through the absorbent liquid outlet. According to the thermocyphon reboiler, a level of the absorbent liquid is hard to be controlled due to boiling. In addition, since there is no wall in the boiler, the mixed liquid remains in the reboiler in a very short time. Therefore, less energy is supplied to the mixed liquid and gas separation efficiency for regeneration is very low.

In addition, a supply path of the mixed liquid and a discharge path of the gas separated from the mixed liquid are the same in the kettle reboiler and the thermocyphon reboiler. Therefore, if bubbles occur due to heating, the mixed liquid cannot reach the heater or the heat-exchanger due to the bubbles. If this condition continues, the level of the mixed liquid in the regeneration tower is raised too high that the absorption tower and the regeneration tower cannot work.

Furthermore, a gas collecting plant using the chemical absorption method includes a condenser for condensing the regeneration gas and generating condensate. A reflux apparatus discharges gas evaporated from the condensate to an exterior thereof to collect the gas and supplies the condensate back into the regeneration tower.

According to a conventional gas collecting plant, the condenser and the reflux apparatus are separately disposed in order to control a level of the condensate in the reflux apparatus. As a result, a volume of the gas collecting plant becomes large, and a large space is necessary to mount the gas collecting plant. In addition, since the reflux apparatus and the condenser are separated, a large amount of heat loss occurs between the reflux apparatus and the condenser.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an absorption tower with an absorption separator having advantages of facilitating level control of rich absorbent liquid in an absorbent liquid chamber by separating a supplying path of the rich absorbent liquid into the absorbent liquid chamber formed in the absorption tower from a path through which object gas flows out from the absorbent liquid chamber.

An aspect of the present inventive concept provides an absorption tower with an absorption separator capable of preventing change of composition in rich absorbent liquid due to fast linear velocity of object gas and deterioration of efficiency by separating a supply path of the rich absorbent liquid and a path of the object gas.

An absorption tower according to an exemplary embodiment of the present inventive concept may include an absorption tower housing. A lean absorbent liquid supplier is disposed inside at an upper portion in the absorption tower housing and supplies a lean absorbent liquid into the absorption tower housing. An absorption tower rectifier is disposed below the lean absorbent liquid supplier in the absorption tower housing, rectifies flow of the lean absorbent liquid supplied downwardly in the absorption tower housing, and dissolves an object gas in the lean absorbent liquid to generate a rich absorbent liquid. An absorbent liquid chamber is disposed below the absorption tower rectifier in the absorption tower housing and temporarily stores the rich absorbent liquid. An absorption separator is disposed between the absorption tower rectifier and the absorbent liquid chamber in the absorption tower housing. The object gas is supplied into the absorbent liquid chamber.

The absorption separator may separate an outlet through which the object gas flows out from the absorbent liquid chamber from an inlet through which the rich absorbent liquid flows into the absorbent liquid chamber.

The absorption separator may include a first mounting plate disposed across the absorption tower housing between the absorption tower rectifier and the absorbent liquid chamber and having at least one first gas flow hole. A first body of hollow pillar shape is mounted on an upper surface of the first mounting plate and has an upper surface blocked by a first roof. At least one first gas bypass port is formed at a side surface of the first body such that an interior of the first body fluidly communicates with an exterior of the first body through the at least one first gas bypass port. A first liquid supplying pipe extends downwardly from the first mounting plate and supplies the rich absorbent liquid into the absorbent liquid chamber. An interior of the absorption tower housing under the first mounting plate fluidly communicates with the interior of the first body through the at least one first gas flow hole.

The first gas bypass port may be formed above the first mounting plate at a predetermined height.

A treated gas outlet, from which target gas is removed to an exterior of the absorption tower housing, may be formed at an upper end portion of the absorption tower housing to discharge a treated gas. An absorption tower outlet may be formed at a lower end portion of the absorption tower housing to supply the rich absorbent liquid to a regeneration tower.

An absorption tower according to another exemplary embodiment of the present inventive concept may include an absorption tower housing. A lean absorbent liquid supplier is disposed at an upper portion in the absorption tower housing and supplies a lean absorbent liquid into the absorption tower housing. An absorbent liquid chamber is formed in a lower portion of the absorption tower housing and temporarily stores the rich absorbent liquid therein. An absorption separator is disposed between the lean absorbent liquid supplier and the absorbent liquid chamber in the absorption tower housing. The lean absorbent liquid supplied into the absorption tower housing absorbs an object gas and is changed into the rich absorbent liquid as flowing downwardly. The rich absorbent liquid is supplied into the absorbent liquid chamber through the absorption separator. The object gas is supplied into the absorbent liquid chamber, flows out from the absorbent liquid chamber through the absorption separator, and flows upwardly in the absorption tower housing. The absorption separator separates an outlet through which the object gas flows out from the absorbent liquid chamber from an inlet through which the rich absorbent liquid flows into the absorbent liquid chamber.

The absorption separator may include a first mounting plate disposed across the absorption tower housing and having at least one first gas flow hole. A first body of hollow pillar shape is mounted on an upper surface of the first mounting plate and has an upper surface blocked by a first roof. At least one first gas bypass port is formed at a side surface of the first body such that an interior of the first body fluidly communicates with an exterior of the first body through the at least one first gas bypass port. A first liquid supplying pipe extends downwardly from the first mounting plate and supplies the rich absorbent liquid into the absorbent liquid chamber. The object gas flows out from the absorbent liquid chamber through the at least one first gas flow hole and the first gas bypass port. The rich absorbent liquid is supplied into the absorbent liquid chamber through the first liquid supplying pipe.

The first gas bypass port may be formed above the first mounting plate at a predetermined height.

The at least one first gas flow hole may be formed at the interior of the first body, and the first liquid supplying pipe may be formed at the exterior of the first body.

An end of the first liquid supplying pipe may extend to be close to a lower end of the absorbent liquid housing.

A treated gas outlet, from which target gas is removed to an exterior of the absorption tower housing, may be formed at an upper end portion of the absorption tower housing to discharge a treated gas. An absorption tower outlet may be formed at a lower end portion of the absorption tower housing to supply the rich absorbent liquid to a regeneration tower.

According to the exemplary embodiments of the present inventive concept, level control of rich absorbent liquid in the absorbent liquid chamber may be facilitated by separating a supply path through which the rich absorbent liquid is supplied into the absorbent liquid chamber formed in a absorption tower from a path through which object gas flows out from the absorbent liquid chamber.

In addition, change of composition in the rich absorbent liquid due to a fast linear velocity of the object gas may be prevented, and efficiency deterioration may be prevented by separating the supply path of the rich absorbent liquid from the path of the object gas.

DETAILED DESCRIPTION OF THE EMBODIMENTS

"Rich absorbent liquid" in this specification and claims means absorbent liquid containing large amount of gas that is removing object or absorbent liquid after absorbing the gas and before regenerating the gas.

"Lean absorbent liquid" in this specification and claims means absorbent liquid containing little amount of gas that is removing object or absorbent liquid from which gas is separated.

"Regeneration" in this specification and claims means separation of gas from absorbent liquid.

"Regeneration gas" in this specification and claims means gas separated from absorbent liquid.

"Object gas" in this specification and claims means gas that is regeneration object, i.e., gas before regeneration.

"Target gas" in this specification and claims means gas that will be separated from the object gas and will be collected.

"Treated gas" in this specification and claims means gas remaining after the object gas is dissolved in absorbent liquid.

"Evaporation gas" in this specification and claims means gas that is evaporated from condensate.

It is to be understood in this specification and claims that an "upper side", an "upper portion" or an "upper end" includes "one side", "one end portion", "one side portion" or "one end", and a "lower side", a "lower portion" or a "lower end" includes the "other side", the "other end portion", the "other side portion" or the "other end".

In addition, exemplary embodiments of the present inventive concept can be applied to a chemical absorption method for separating gas by heating absorbent liquid after the gas is absorbed in the absorbent liquid as well as a chemical absorption method for trapping carbon dioxide. Therefore, it is to be understood that the scope of the present disclosure is not limited to a gas collecting plant used in the chemical absorption method for trapping the carbon dioxide.

Exemplary embodiments of the present inventive concept will hereinafter be described in detail with reference to the accompanying drawings.

Figure 1:
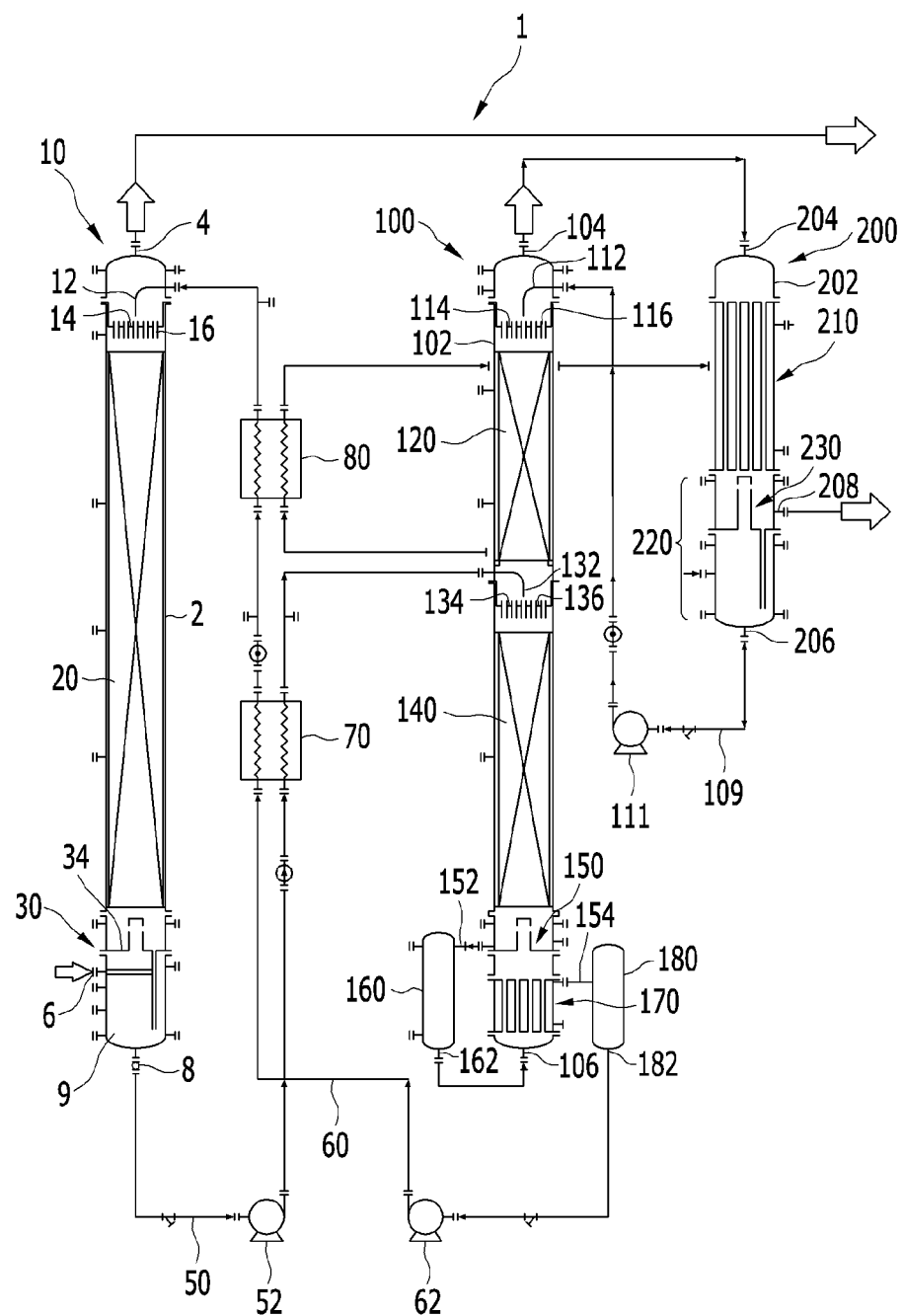
FIG. 1 is a schematic diagram of a gas collecting plant according to an exemplary embodiment of the present inventive concept.
Figure 2:
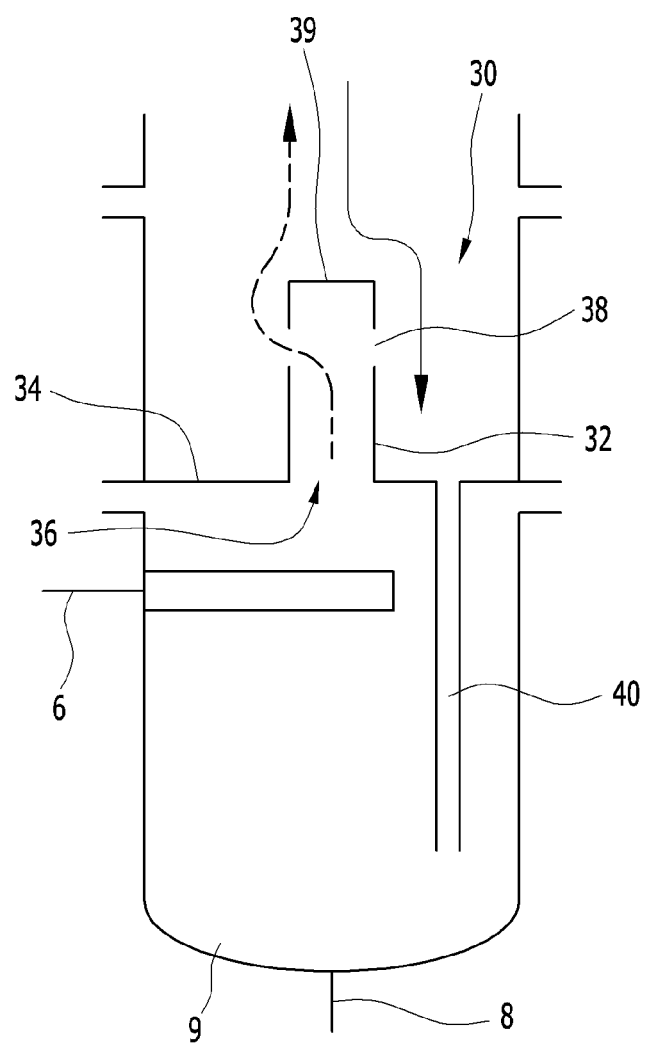
FIG. 2 is a schematic diagram of an absorption separator according to an exemplary embodiment of the present inventive concept.
Figure 3:
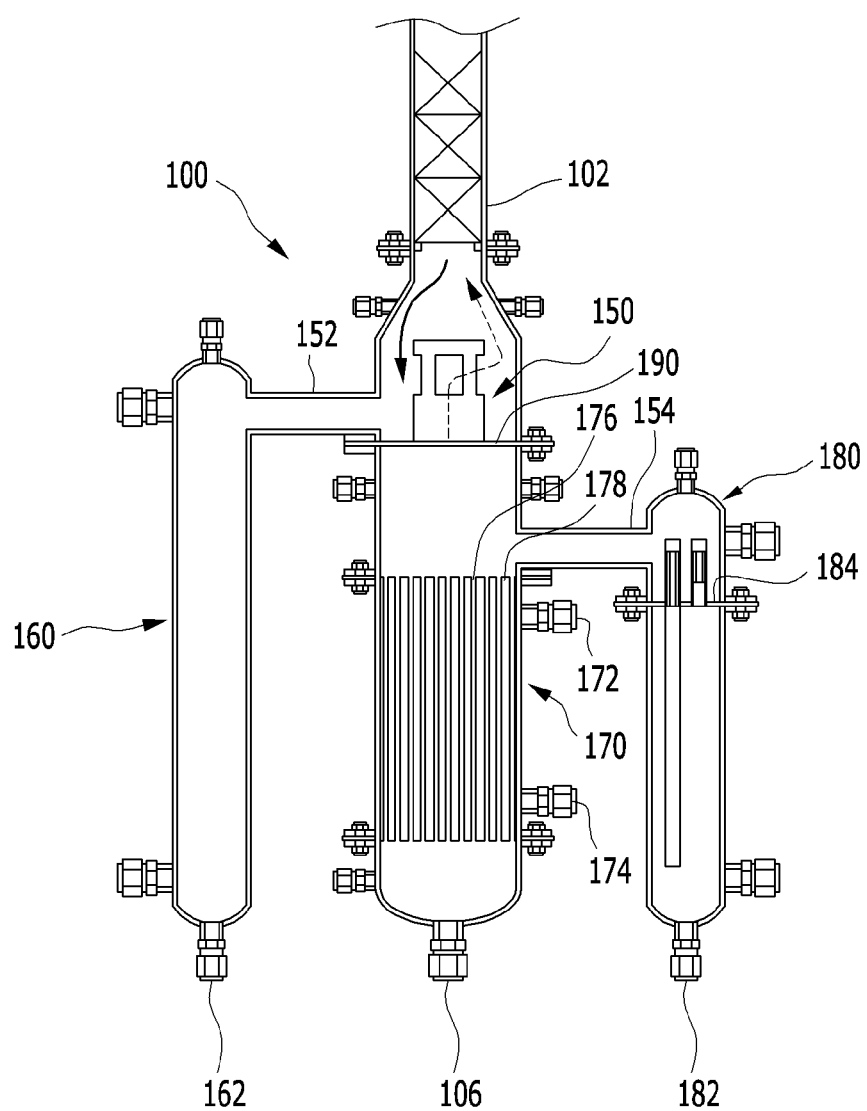
FIG. 3 is a schematic diagram of a reboiling device according to an exemplary embodiment of the present inventive concept.
Figure 4:
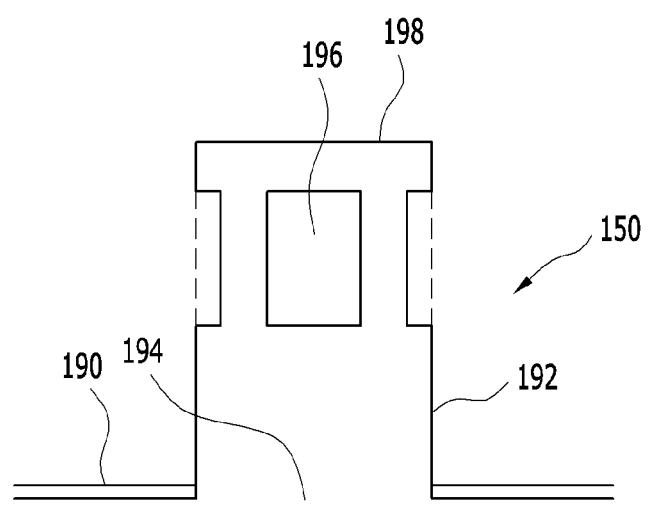
FIG. 4 is a schematic diagram of a regeneration separator according to an exemplary embodiment of the present inventive concept.
Figure 5:
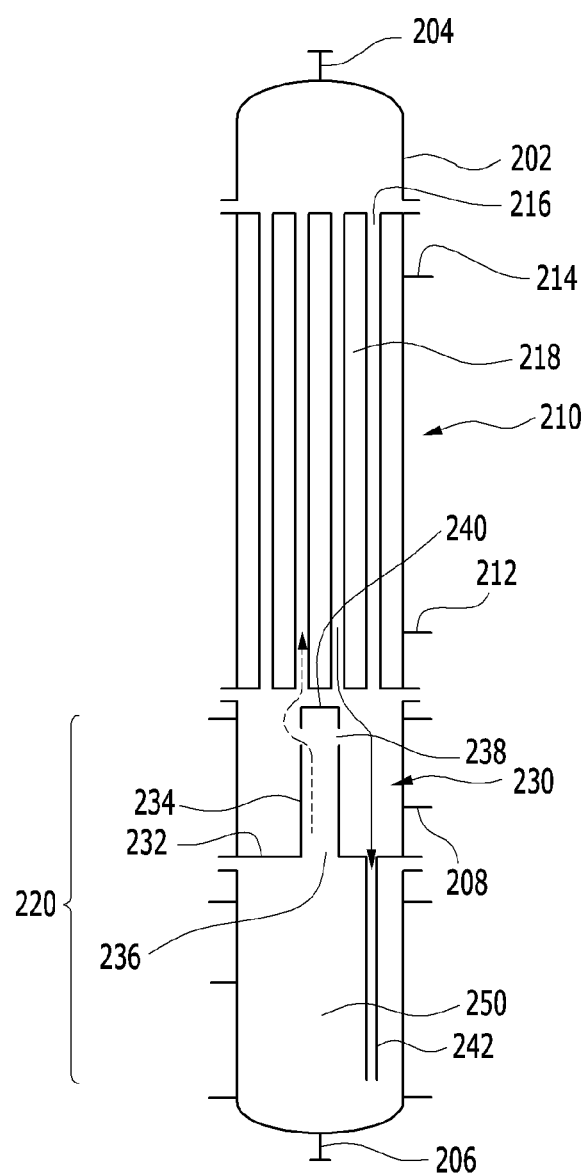
FIG. 5 is a schematic diagram of a gas condenser according to an exemplary embodiment of the present inventive concept.

FIG. 1 is a schematic diagram of a gas collecting plant according to an exemplary embodiment of the present inventive concept. FIG. 2 is a schematic diagram of an absorption separator according to an exemplary embodiment of the present inventive concept. FIG. 3 is a schematic diagram of a reboiling device according to an exemplary embodiment of the present inventive concept. FIG. 4 is a schematic diagram of a regeneration separator according to an exemplary embodiment of the present inventive concept. and FIG. 5 is a schematic diagram of a gas condenser according to an exemplary embodiment of the present inventive concept.

As shown in FIG. 1, a gas collecting plant 1 according to an exemplary embodiment of the present inventive concept includes an absorption tower 10, a regeneration tower 100, and a gas condenser 200.

The absorption tower 10 dissolves object gas that needs regeneration in lean absorbent liquid to produce rich absorbent liquid, and includes an absorption tower housing 2.

A space is formed in the absorption tower housing 2, and a lean absorbent liquid supplier 12, a plate 14, an absorption tower rectifier 20 and an absorption separator 30 are sequentially disposed in the space from an upper portion to a lower portion. An absorbent liquid chamber 9 is formed at a lower portion of the absorption tower housing 2, that is, under the absorption separator 30.

The lean absorbent liquid supplier 12 is disposed at an upper portion in the absorption tower housing 2 and is connected to the regeneration tower 100 through a lean absorbent liquid line 60. The lean absorbent liquid supplier 12 supplies the lean absorbent liquid received from the regeneration tower 100 through the lean absorbent liquid line 60 into the absorption tower housing 2. The lean absorbent liquid supplied into the absorption tower housing 2 flows downwardly toward the lower portion of the absorption tower housing 2 by gravity.

The plate 14 is mounted in the absorption tower housing 2 under the lean absorbent liquid supplier 12. The plate 14 is mounted across the absorption tower housing 2, and at least one penetration hole 16 is formed on the plate 14. The lean absorbent liquid falling toward the lower portion of the absorption tower housing 2 is evenly dispersed in the absorption tower housing 2 by the plate 14 and the penetration hole 16.

The absorption tower rectifier 20 is disposed in the absorption tower housing 2 under the plate 14. The absorption tower rectifier 20 may be manufactured by twisting a thin and long wire in an irregular shape, but a method of manufacturing the absorption tower rectifier 20 is not limited hereto. On the contrary, a foam plastic having large porosity may be used as the absorption tower rectifier 20. The absorption tower rectifier 20 rectifies the lean absorbent liquid to smoothen flow thereof. In addition, the lean absorbent liquid and the object gas passing through the absorption tower rectifier 20 combine together, and the object gas is dissolved into the lean absorbent liquid, thereby generating the rich absorbent liquid.

The absorption separator 30 disposed in the absorption tower housing 2 between the absorption tower rectifier 20 and the absorbent liquid chamber 9. The absorption separator 30 separates an inlet through which the rich absorbent liquid supplied into the absorbent liquid chamber 9 from an outlet through which the object gas flows out from the absorbent liquid chamber. For these purposes, the absorption separator 30, as shown in FIG. 2, includes a first mounting plate 34, a first body 32, and a first gas bypass port 38.

The first mounting plate 34 is disposed across the absorption tower housing 2 below the absorption tower rectifier 20. At least one first gas flow hole 36 and a first liquid supplying pipe 40 are formed at the first mounting plate 34.

The first body 32 is mounted on an upper surface of the first mounting plate 34 and extends upwardly. An upper surface of the first body 32 is blocked by a first roof 39 such that the dropped rich absorbent liquid does not enter an interior of the first body 32 but pours on the first mounting plate 34. The rich absorbent liquid poured on the first mounting plate 34 is supplied into the absorbent liquid chamber 9 through the first liquid supplying pipe 40. At this time, the first liquid supplying pipe 40 extends toward the lower end of the absorbent liquid chamber 9 and close to a bottom portion of the absorption tower housing 2. Therefore, the rich absorbent liquid is supplied under a surface of the rich absorbent liquid that is temporarily stored in the absorbent liquid chamber 9, thereby preventing occurrence of big wave on the surface of the rich absorbent liquid that is temporarily stored in the absorbent liquid chamber 9 and facilitating level control of the rich absorbent liquid.

In addition, the first body 32 encloses the at least one first gas flow hole 36 to prevent the rich absorbent liquid from being directly supplied through the first body 32 to the surface of the rich absorbent liquid that is temporarily stored in the absorbent liquid chamber 9.

The at least one first gas bypass port 38 is formed at a side of the first body 32 to fluidly communicates with an exterior of the first body 32. The at least one first gas bypass port 38 is formed at a predetermined height from the first mounting plate 34 such that the rich absorbent liquid poured on the first mounting plate 34 is prevented from entering the interior of the first body 32 through the first gas bypass port 38.

A treated gas outlet 4, an object gas inlet 6, and an absorption tower outlet 8 are further formed at the absorption tower housing 2.

The treated gas outlet 4 exhausts treated gas that remains after being dissolved into the absorbent liquid to the exterior of the absorption tower 10, and is formed at the upper portion of the absorption tower housing 2.

The object gas inlet 6 supplies the object gas that needs regeneration into the absorption tower 10, and is formed at the lower portion of the absorption tower housing 2, that is, at the absorbent liquid chamber 9. Therefore, the object gas supplied into the absorbent liquid chamber 9 is dissolved into the absorbent liquid when passing through the absorption separator 30 and the absorption tower rectifier 20, and the treated gas is exhausted to the exterior of the absorption tower 10 through the treated gas outlet 4 at the upper portion of the absorption tower housing 2.

The absorption tower outlet 8 is formed at a lower end portion of the absorption tower housing 2. Therefore, the rich absorbent liquid that is temporarily stored in the absorbent liquid chamber 9 is supplied to the regeneration tower 100 through the absorption tower outlet 8. For this purpose, the absorption tower outlet 8 is connected to the regeneration tower 100 through a rich absorbent liquid line 50.

First and second pumps 52 and 62 are mounted on the rich absorbent liquid line 50 and the lean absorbent liquid line 60 so as to pump the rich absorbent liquid and the lean absorbent liquid, respectively. In addition, at least one heat exchanger 70 and 80 is mounted on the rich absorbent liquid line 50 and the lean absorbent liquid line 60 so as to exchange heat between the lean absorbent liquid and the rich absorbent liquid.

The lean absorbent liquid is supplied to the upper portion of absorption tower 10 through the lean absorbent liquid supplier 12, and the object gas is supplied to the absorbent liquid chamber 9 through the object gas inlet 6. The lean absorbent liquid flows downwardly toward the lower portion of the absorption tower 10 by gravity. The object gas flows out from the absorbent liquid chamber 9 through the first gas flow hole 36 and the first gas bypass port 38 of the absorption separator 30 and moves upwardly toward the upper portion of the absorption tower 10. The lean absorbent liquid and the object gas meet together at the absorption tower rectifier 20 and the object gas is dissolved into the lean absorbent liquid so as to produce the rich absorbent liquid.

The rich absorbent liquid flows to the lower portion of the absorption tower 10 and is poured on the first mounting plate 34. After that, the rich absorbent liquid is supplied to the lower portion of the absorbent liquid chamber 9 through the first liquid supplying pipe 40. Therefore, big wave does not occur on the surface of the rich absorbent liquid stored in the absorbent liquid chamber 9, and level control of the rich absorbent liquid may be facilitated. In addition, since a path through which the rich absorbent liquid is supplied into the absorbent liquid chamber 9 and a path through which the object gas flows out from the absorbent liquid chamber 9 are separated, volatile components can be prevented from being removed from the rich absorbent liquid due to fast linear velocity of the object gas and composition of the absorbent liquid composition is changed. As a result, deterioration of efficiency due to change of composition in the absorbent liquid may be prevented.

In addition, the treated gas remaining after being dissolved in the absorbent liquid moves upwardly toward the upper portion of the absorption tower 10 and is exhausted to the exterior of the absorption tower 10 through the treated gas outlet 4.

As shown in FIG. 1, the regeneration tower 100 according to an exemplary embodiment of the present inventive concept includes a regeneration tower housing 102.

A space is formed in the regeneration tower housing 102, and a first rich absorbent liquid supplier 112, a first regeneration tower rectifier 120, a second rich absorbent liquid supplier 132, and a second regeneration tower rectifier 140 are sequentially disposed in the space. In addition, a regeneration gas outlet 104 is formed at an upper end of the regeneration tower housing 102, and a rich absorbent liquid inlet 106 is formed at a lower end of the regeneration tower housing 102.

The first rich absorbent liquid supplier 112 is disposed at an upper portion in the regeneration tower housing 102, and receives the rich absorbent liquid from the absorbent liquid chamber 9 through the rich absorbent liquid line 50 or receives condensate from the gas condenser 200 or a heat exchanger (not shown) through a condensate line 109. The first rich absorbent liquid supplier 112 supplies the rich absorbent liquid received through the rich absorbent liquid line 50 and/or the condensate received through the condensate line 109 into the regeneration tower housing 102. The rich absorbent liquid and/or the condensate supplied to the first rich absorbent liquid supplier 112 flows downwardly toward a lower portion of the regeneration tower housing 102 by gravity.

A plate 114 is mounted in the regeneration tower housing 102 under the first rich absorbent liquid supplier 112. The plate 114 is mounted across the regeneration tower housing 102, and at least one penetration hole 116 is formed on the plate 114. The rich absorbent liquid and/or the condensate falling toward the lower portion of the regeneration tower housing 102 is evenly dispersed in the regeneration tower housing 102 by the plate 114 and the penetration hole 116.

The first regeneration tower rectifier 120 is disposed in the regeneration tower housing 102 under the plate 114. The first regeneration tower rectifier 120 may be manufactured by twisting a thin and long wire in an irregular shape, but a method of manufacturing the first regeneration tower rectifier 120 is not limited to this. A foam plastic having large porosity may be used as the first regeneration tower rectifier 120. The first regeneration tower rectifier 120 rectifies the rich absorbent liquid and/or the condensate so as to smoothen flow thereof.

The second rich absorbent liquid supplier 132 is disposed in the regeneration tower housing 102 under the first regeneration tower rectifier 120, and receives the rich absorbent liquid from the absorbent liquid chamber 9 through the rich absorbent liquid line 50. The second rich absorbent liquid supplier 132 supplies the rich absorbent liquid received through the rich absorbent liquid line 50 into the regeneration tower housing 102. The rich absorbent liquid supplied from the second rich absorbent liquid supplier 132 flows downwardly toward the lower portion of the regeneration tower housing 102 by gravity.

The rich absorbent liquid supplied to the second rich absorbent liquid supplier 132 may be the same as or different from that supplied to the first rich absorbent liquid supplier 112.

The plate 134 is mounted in the regeneration tower housing 102 under the second rich absorbent liquid supplier 132. The plate 134 is mounted across the regeneration tower housing 102, and at least one penetration hole 136 is formed on the plate 134. The rich absorbent liquid and/or the condensate falling downwardly toward the lower portion of the regeneration tower housing 102 is evenly dispersed in the regeneration tower housing 102 by the plate 134 and the penetration hole 136.

The second regeneration tower 140 rectifier is disposed in the regeneration tower housing 102 under the plate 134. The second regeneration tower rectifier 140 may be manufactured by twisting a thin and long wire in an irregular shape, but a method of manufacturing the second regeneration tower rectifier 140 is not limited to this. On the contrary, a foam plastic having large porosity may be used as the second regeneration tower rectifier 140. The second regeneration tower rectifier 140 rectifies the rich absorbent liquid and/or the condensate supplied from the first rich absorbent liquid supplier 112 to smoothen flow thereof, and rectifies the rich absorbent liquid supplied from the second rich absorbent liquid supplier 132 so as to smoothen flow thereof.

The regeneration tower 100 further includes a reboiling device. The reboiling device, as shown in FIG. 1, is disposed below the second regeneration tower rectifier 140 and includes a rich absorbent liquid tank 160, a reboiler 170, a regeneration separator 150 and a lean absorbent liquid tank 180. The reboiling device regenerates gas contained in the rich absorbent liquid supplied from the second regeneration tower rectifier 140.

The rich absorbent liquid tank 160, as shown in FIG. 3, fluidly communicates with the regeneration tower housing 102 through a rich absorbent liquid connection line 152 such that the rich absorbent liquid and/or the condensate passing through the second regeneration tower rectifier 140 is supplied to the rich absorbent liquid tank 160 through the rich absorbent liquid connection line 152. A rich absorbent liquid outlet 162 is formed at the lower portion of the rich absorbent liquid tank 160.

The reboiler 170 is mounted in the regeneration tower housing 102 below the second regeneration tower rectifier 140, and is positioned above a bottom portion of the regeneration tower housing 102 by a predetermined distance. The reboiler 170 boils the rich absorbent liquid so as to separate regeneration gas from the rich absorbent liquid. The reboiler 170 includes a rich absorbent liquid inlet 106, a first operating fluid inlet 172, a first circulation line 176, a second circulation line 178, and a first operating fluid outlet 174.

The rich absorbent liquid inlet 106 is formed at a lower portion of the regeneration tower housing 102 and fluidly communicates with the rich absorbent liquid outlet 162 so as to receive the rich absorbent liquid from the rich absorbent liquid tank 160. Therefore, the rich absorbent liquid tank 160 supplies the rich absorbent liquid to the regeneration tower housing 102. As the rich absorbent liquid is supplied to the regeneration tower housing 102, a level of the rich absorbent liquid in the regeneration tower housing 102 rises and the rich absorbent liquid is supplied to the reboiler 170.

The first operating fluid inlet 172 is formed at a position corresponding to the reboiler 170 of the regeneration tower housing 102 and supplies operating fluid to the reboiler 170. The operating fluid may be water vapor generated in power plants or boiler equipments but may not be limited to this.

The first circulation line 176 is formed in the reboiler 170, and the operating fluid through the first operating fluid inlet 172 flows in the first circulation line 176. The first circulation line 176 does not fluidly communicate with the interior of the regeneration tower housing 102.

The second circulation line 178 is formed in the reboiler 170 and is formed close to the first circulation line 176. Typically, a portion of the reboiler 170 other than the first circulation line 176 becomes the second circulation line 178. The second circulation line 178 fluidly communicates with the interior of the regeneration tower housing 102 such that the rich absorbent liquid exists in the second circulation line 178 if the level of the rich absorbent liquid supplied to the regeneration tower housing 102 rises. At this time, the rich absorbent liquid in the second circulation line 178 exchanges heat with the operating fluid flowing through the first circulation line 176. Therefore, the regeneration gas is separated from the rich absorbent liquid, and thereby, the lean absorbent liquid is positioned at an upper portion of the reboiler 170. In addition, the regeneration gas separated from the rich absorbent liquid moves upwardly in the regeneration tower housing 102.

The first operating fluid outlet 174 is formed at a position corresponding to the reboiler 170 of the regeneration tower housing 102, and the operating fluid circulating through the first circulation line 176 is exhausted to the exterior of the regeneration tower housing 102 through the first operating fluid outlet 174.

Herein, it is exemplified but is not limited that the reboiler 170 is a heat exchanger heating the rich absorbent liquid by heat-exchange with the operating fluid. The reboiler 170 may be an electric wire that receives current and generates heat.

The regeneration separator 150 is mounted in the regeneration tower housing 102 between the second regeneration tower rectifier and the reboiler 170, and separates a supply path of the rich absorbent liquid into the reboiler 170 from an exhaust path of the regeneration gas generated in the reboiler 170. For these purposes, the regeneration separator 150, as shown in FIG. 4, includes a second mounting plate 190, a second body 192, and a second gas bypass port 196.

The second mounting plate 190 is disposed across the regeneration tower housing 102 below a connecting portion of the rich absorbent liquid connection line 152 and the regeneration tower housing 102. At least one second gas flow hole 194 is formed at the second mounting plate 190.

The second body 192 is mounted on an upper surface of the second mounting plate 190 and extends upwardly. An upper surface of the second body 192 is blocked by a second roof 198 such that the dropped rich absorbent liquid and/or condensate do not enter an interior of the second body 192 and are poured on the second mounting plate 190. The rich absorbent liquid poured on the second mounting plate 190 moves to the rich absorbent liquid tank 160 through the rich absorbent liquid connection line 152. In addition, the second body 192 encloses the at least one second gas flow hole 194 so as to prevent the rich absorbent liquid poured on the second mounting plate 190 form being directly supplied to the reboiler 170.

The at least one second gas bypass port 196 is formed at a side surface of the second body 192 to fluidly communicates with an exterior of the second body 192. The at least one second gas bypass port 196 is formed at a predetermined height from the second mounting plate 190 such that the rich absorbent liquid poured on the second mounting plate 190 is prevented from entering the interior of the second body 192 through the second gas bypass port 196. That is, vertical position of the rich absorbent liquid connection line 152 is lower than that of the at least one second gas bypass port 196.

The lean absorbent liquid tank 180, as shown in FIG. 3, fluidly communicates with the regeneration tower housing 102 through a lean absorbent liquid connection line 154 such that the lean absorbent liquid from which the regeneration gas is separated in the reboiler 170 flows into the lean absorbent liquid tank 180 through the lean absorbent liquid connection line 154. A connecting portion of the lean absorbent liquid connection line 154 and the regeneration tower housing 102 is positioned between the second mounting plate 190 and the reboiler 170. Therefore, the rich absorbent liquid undergoing the regeneration in the reboiler 170 is not supplied to the regeneration separator 150 but is supplied to the lean absorbent liquid tank 180.

A lean absorbent liquid outlet 182 is formed at a lower end of the lean absorbent liquid tank 180 and is connected to the lean absorbent liquid supplier 12 through the lean absorbent liquid line 60. Therefore, the lean absorbent liquid in the lean absorbent liquid tank 180 is supplied back to the lean absorbent liquid supplier 12 through the lean absorbent liquid line 60. In addition, a supporting plate 184 is mounted in the lean absorbent liquid tank 180 and a level sensor, and a pressure sensor may be mounted on the supporting plate 184. The level sensor detects a level of the lean absorbent liquid in the lean absorbent liquid tank 180, and the pressure sensor detects pressure of the lean absorbent liquid tank 180. In addition, the lean absorbent liquid outlet 182 can be closed or open based on detecting results by the level sensor and the pressure sensor.

If the rich absorbent liquid is supplied from the absorption tower 10 into the regeneration tower housing 102 through the first rich absorbent liquid supplier 112 or the second rich absorbent liquid supplier 32, the rich absorbent liquid flows downwardly by gravity. At this time, the flow of the rich absorbent liquid is rectified by the first regeneration tower rectifier 120 or the second regeneration tower rectifier.

The rich absorbent liquid, as represented by a solid line arrow in FIG. 3, cannot move into the interior of the second body 192 by the second roof 198 but moves onto the second mounting plate 190. Therefore, the rich absorbent liquid is poured on the second mounting plate 190. If the level of the rich absorbent liquid poured on the second mounting plate 190 becomes higher than a height of a lower end of the rich absorbent liquid connection line 152, the rich absorbent liquid is supplied into the rich absorbent liquid tank 160 through the rich absorbent liquid connection line 152 and is then supplied into the regeneration tower housing 102 through the rich absorbent liquid outlet 162 and the rich absorbent liquid inlet 106.

If the level of the rich absorbent liquid in the regeneration tower housing 102 becomes higher and the rich absorbent liquid is supplied into the reboiler 170, the rich absorbent liquid is heated and the regeneration gas is separated from the rich absorbent liquid through heat-exchange between the rich absorbent liquid and the operating fluid. The regeneration gas separated from the rich absorbent liquid, as represented by a dotted line arrow in FIG. 3, moves to the exterior of the second body 192 through the second gas flow hole 194 and the second gas bypass port 196. The regeneration gas moves upwardly and is exhausted to the exterior of the regeneration tower housing 102 through the regeneration gas outlet 104.

As the rich absorbent liquid is supplied to the reboiler 170 continuously, the level of the lean absorbent liquid, from which the regeneration gas is separated, becomes higher. If the level of the lean absorbent liquid becomes higher than a height of the lower end of the lean absorbent liquid connection line 154, the lean absorbent liquid is supplied to the lean absorbent liquid tank 180 through the lean absorbent liquid connection line 154. The lean absorbent liquid supplied to the lean absorbent liquid tank 180 is supplied back to the absorption tower 10 through the lean absorbent liquid outlet 182.

As shown in FIG. 1, the gas condenser 200 according to an exemplary embodiment of the present inventive concept includes a housing 202.

A space is formed in the housing 202, a condenser 210 is mounted in an upper portion of the space, and a reflux apparatus 220 is mounted in a lower portion of the space.

The condenser 210 is mounted in the upper portion of the housing 202 and condenses the regeneration gas and separate target gas from condensate. The condenser 210 includes a second operating fluid inlet 212, a third circulation line 216, a fourth circulation line 218, and a second operating fluid outlet 214.

The second operating fluid inlet 212 is formed at a position corresponding to the condenser 210 of the housing 202 and supplies the operating fluid to the condenser 210. The operating fluid may be coolant but may not be limited to this.

The third circulation line 216 is formed in the condenser 210 and the operating fluid through the second operating fluid inlet 212 flows in the third circulation line 216. The third circulation line 216 does not fluidly communicate with the interior of the housing 202.

The fourth circulation line 218 is formed in the condenser 210 and is close to the third circulation line 216. Typically, a portion of the condenser 210 other than the third circulation line 216 becomes the fourth circulation line 218. The fourth circulation line 218 fluidly communicates with the interior of the housing 202 such that the regeneration gas supplied to the housing 102 passes through the fourth circulation line 218. At this time, the regeneration gas in the fourth circulation line 218 is condensed through heat-exchange with the operating fluid passing through the third circulation line 216. Therefore, the target gas is separated from the condensate, and the condensate is supplied to the reflux apparatus 220.

The second operating fluid outlet 214 is formed at a position corresponding to the condenser 210 of the housing 102, and the operating fluid passing through the third circulation line 216 is exhausted to the exterior of the housing 102 through the second operating fluid outlet 214.

The reflux apparatus 220, as shown in FIG. 5, includes a condensate chamber 250 and a reflux separator 230.

The condensate chamber 250 is formed at the lower portion of the housing 202 and stores the condensate temporarily.

The reflux separator 230 is disposed between the condenser 210 and the condensate chamber 250 in the housing 202. The reflux separator 230 separates an inlet through which the condensate supplies into the condensate chamber 250 from an outlet through which the evaporation gas is exhausted from the condensate chamber 250. For these purposes, the reflux separator 230, as shown in FIG. 5, includes a third mounting plate 232, a third body 234, and a third gas bypass port 238.

The third mounting plate 232 is disposed across the housing 202 below the condenser 210. At least one third gas flow hole 236 and a second liquid supplying pipe 242 are formed at the third mounting plate 232.

The third body 234 is mounted on an upper surface of the third mounting plate 232 and extends upwardly. An upper surface of the third body 234 is blocked by a third roof 240 such that the dropped condensate does not enter an interior of the third body 234 but is poured on the third mounting plate 232. The condensate pooled on the third mounting plate 232 is supplied into the condensate chamber 250 through the second liquid supplying pipe 242. At this time, the second liquid supplying pipe 242 extends toward the lower end of the condensate chamber 250 and close to a bottom portion of the condensate chamber 250. Therefore, the condensate is supplied under a surface of the condensate that is temporarily stored in the condensate chamber 250, thereby preventing occurrence of big wave on the surface of the condensate that is temporarily stored in the condensate chamber 250 and facilitating level control of the condensate.

In addition, the third body 234 encloses the at least one third gas flow hole 236 to prevent the condensate from being directly supplied through the third body 234 to the surface of the condensate that is temporarily stored in the condensate chamber 250.

The at least one third gas bypass port 238 is formed at a side of the third body 234 to fluidly communicates with an exterior of the third body 234. The at least one third gas bypass port 238 is formed at a predetermined height from the third mounting plate 232 such that the condensate poured on the third mounting plate 232 is prevented from entering the third body 234 through the third gas bypass port 238.

A regeneration gas inlet 204, a condensate outlet 206, and a target gas outlet 208 are formed at the housing 202.

The regeneration gas inlet 204 is formed at an upper end portion of the housing 202 and fluidly communicates with the regeneration gas outlet 104 of the regeneration tower housing 102. Therefore, the regeneration gas generated in the regeneration tower 100 is supplied into the upper end portion of the housing 202 through the regeneration gas outlet 104 and the regeneration gas inlet 204.

The condensate outlet 206 is formed at a lower end portion of the housing 202 and is connected to the first rich absorbent liquid supplier 112 through the condensate line 109. Therefore, the condensate that is temporarily stored in the condensate chamber 250 is supplied back to the regeneration tower 100 through the condensate outlet 206 and the condensate line 109. A third pump 111 is mounted on the condensate line 109 so as to pump the condensate in the condensate chamber 250.

The target gas outlet 208 is formed between the condenser 210 and the reflux separator 230 at the housing 202. The target gas separated from the condensate in the condenser 210 is exhausted from the gas condenser 200 through the target gas outlet 208 and is then collected in an additional tank.

The regeneration gas is supplied to the upper portion of the gas condenser 200 through the regeneration gas inlet 204. The regeneration gas supplied to the gas condenser 200 moves downwardly toward the lower portion of the gas condenser 200 and passes through the condenser 210. At this time, the regeneration gas is condensed in the condenser 210 and is separated into the condensate and the target gas.

The target gas is exhausted to the exterior of the gas condenser 200 through the target gas outlet 208, and the condensate is poured on the third mounting plate 232. Then, the condensate is supplied to the lower portion of the condensate chamber 250 through the second liquid supplying pipe 242. Therefore, big wave does not occur on the surface of the condensate stored in the condensate chamber 250, and level control of the condensate may be facilitated.

In addition, the evaporation gas may be evaporated from the condensate that is temporarily stored in the condensate chamber 250. The evaporation gas is exhausted from the condensate chamber 250 through the third gas flow hole 236 of the reflux separator 230 and the third gas bypass port 238, and is then condensed in the condenser 210 again. At this time, since a path through which the condensate is supplied to the condensate chamber 250 is separated from a path through which the evaporation gas is exhausted from the condensate chamber 250, flow interference between the condensate and the evaporation gas may be prevented, thereby facilitating re-condensing the evaporation gas.

The condensate temporarily stored in the condensate chamber 250 is supplied back to the regeneration tower 100 through the condensate line 109.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. An absorption tower for dissolving an object gas in a lean absorbent liquid to generate and supply a rich absorbent liquid, the absorption tower comprising:
   an absorption tower housing;
   a lean absorbent liquid supplier, disposed inside at an upper portion of the absorption tower housing, and supplying the lean absorbent liquid into the absorption tower housing;
   an absorption tower rectifier disposed under the lean absorbent liquid supplier in the absorption tower housing, the absorption tower rectifier rectifying flow of the lean absorbent liquid supplied downwardly in the absorption tower housing and dissolving the object gas in the lean absorbent liquid to generate the rich absorbent liquid;
   an absorbent liquid chamber disposed below the absorption tower rectifier in the absorption tower housing and temporarily storing the rich absorbent liquid therein; and
   an absorption separator disposed between the absorption tower rectifier and the absorbent liquid chamber in and cross the absorption tower housing,
   wherein the object gas is supplied into the absorbent liquid chamber and flows upwardly to the absorption tower rectifier through the absorption separator, and
   wherein the absorption separator separates an outlet through which the object gas flows out from the absorbent liquid chamber from an inlet through which the rich absorbent liquid flows into the absorbent liquid chamber such that the object gas does not meet the rich absorbent liquid in the absorption separator.

2. The absorption tower of claim 1, wherein the absorption separator comprises:
   a first mounting plate disposed across the absorption tower housing between the absorption tower rectifier and the absorbent liquid chamber, and having at least one first gas flow hole;
   a first body mounted on an upper surface of the first mounting plate, the first body having a hollow pillar shape and having an upper surface blocked by a first roof;

at least one first gas bypass port formed at a side surface of the first body such that an interior of the first body fluidly communicates with an exterior of the first body; and a first liquid supplying pipe extending downwardly from the first mounting plate and supplying the rich absorbent liquid into the absorbent liquid chamber, wherein an interior of the absorption tower housing under the first mounting plate fluidly communicates with the interior of the first body through the at least one first gas flow hole.

3. The absorption tower of claim 2, wherein the first gas bypass port is formed above the first mounting plate at a predetermined height.

4. The absorption tower of claim 1, further comprising:
a treated gas outlet, from which a target gas is removed to an exterior of the absorption tower housing, formed at an upper end portion of the absorption tower housing to discharge a treated gas, and an absorption tower outlet formed at a lower end portion of the absorption tower housing to supply the rich absorbent liquid to a regeneration tower.

5. The absorption tower of claim 1, wherein the absorption tower housing includes a plate mounted under the lean absorbent liquid supplier and having at least one penetration hole.

6. An absorption tower for dissolving an object gas in a lean absorbent liquid to generate and supply a rich absorbent liquid, the absorption tower comprising:
an absorption tower housing;
a lean absorbent liquid supplier disposed inside at an upper portion of the absorption tower housing and supplying the lean absorbent liquid into the absorption tower housing;

an absorbent liquid chamber formed in a lower portion of the absorption tower housing and temporarily storing the rich absorbent liquid therein; and an absorption separator disposed between the lean absorbent liquid supplier and the absorbent liquid chamber in and cross the absorption tower housing, wherein the lean absorbent liquid supplied into the absorption tower housing absorbs the object gas and is changed into the rich absorbent liquid as flowing downwardly, and the rich absorbent liquid is supplied into the absorbent liquid chamber through the absorption separator, the object gas is supplied into the absorbent liquid chamber, flows out from the absorbent liquid chamber through the absorption separator, and flows upwardly in the absorption tower housing, and the absorption separator separates an outlet through which the object gas flows out from the absorbent liquid chamber from an inlet through which the rich absorbent liquid flows into the absorbent liquid chamber such that the object gas does not meet the rich absorbent liquid in the absorption separator.

7. The absorption tower of claim 6, wherein the absorption separator comprises:
a first mounting plate disposed across the absorption tower housing and having at least one first gas flow hole;

a first body mounted on an upper surface of the first mounting plate, the first body having a hollow pillar shape and having an upper surface blocked by a first roof;

at least one first gas bypass port formed at a side surface of the first body such that an interior of the first body fluidly communicates with an exterior of the first body through the at least one first gas bypass port; and a first liquid supplying pipe extending downwardly from the first mounting plate and supplying the rich absorbent liquid into the absorbent liquid chamber, wherein the object gas flows out from the absorbent liquid chamber through the at least one first gas flow hole and the at least one first gas bypass port, and the rich absorbent liquid is supplied into the absorbent liquid chamber through the first liquid supplying pipe.

8. The absorption tower of claim 7, wherein the at least one first gas bypass port is formed above the first mounting plate at a predetermined height.

9. The absorption tower of claim 7, wherein the at least one first gas flow hole is at the interior of the first body and the first liquid supplying pipe is at the exterior of the first body.

10. The absorption tower of claim 7, wherein an end of the first liquid supplying pipe extends to be close to a lower end of the absorbent liquid housing.

* * * * *